No. 812,213. PATENTED FEB. 13, 1906.
J. W. LATIMER.
HAY LOADER.
APPLICATION FILED OCT. 11, 1905.
6 SHEETS—SHEET 4.
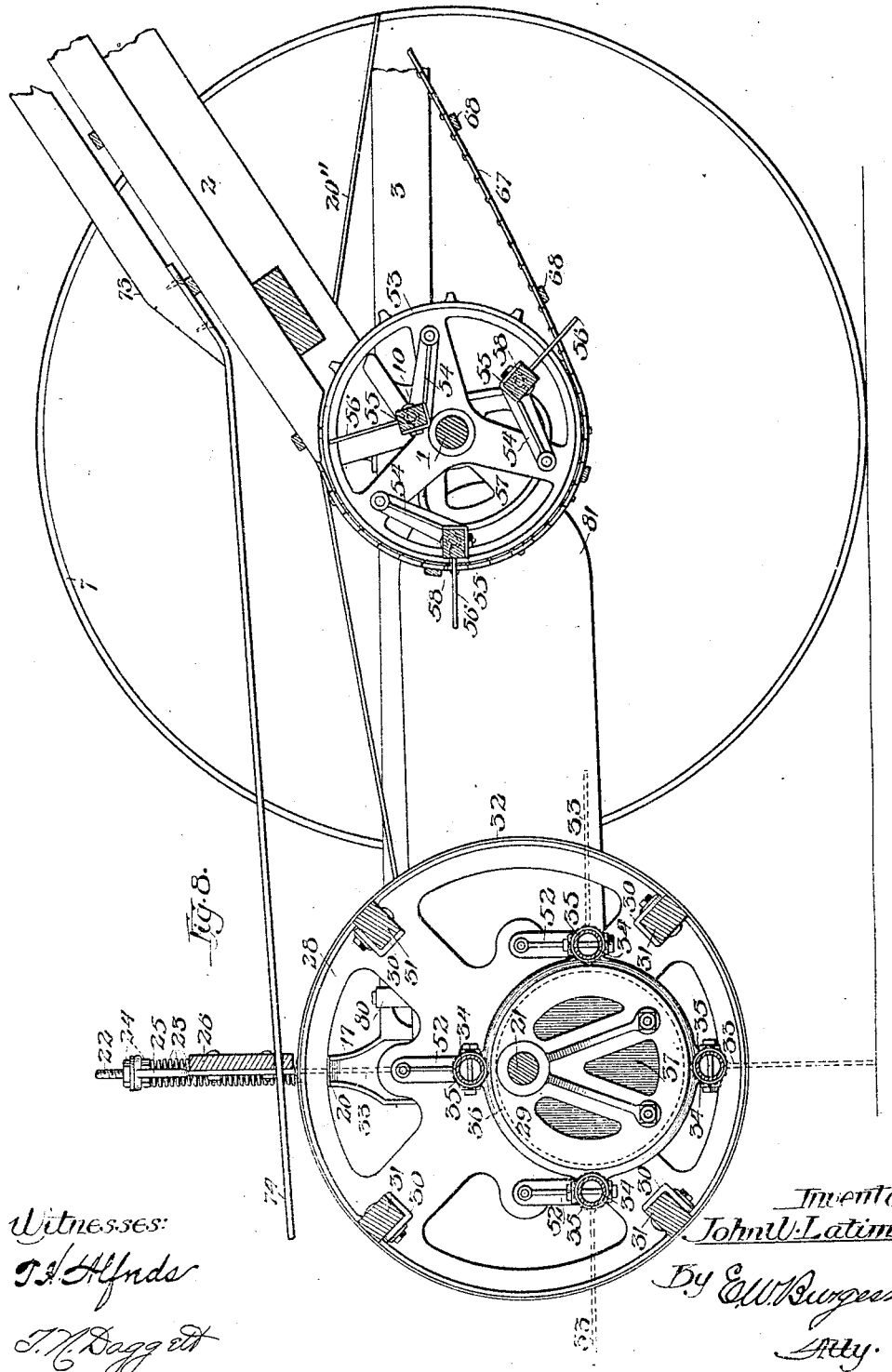

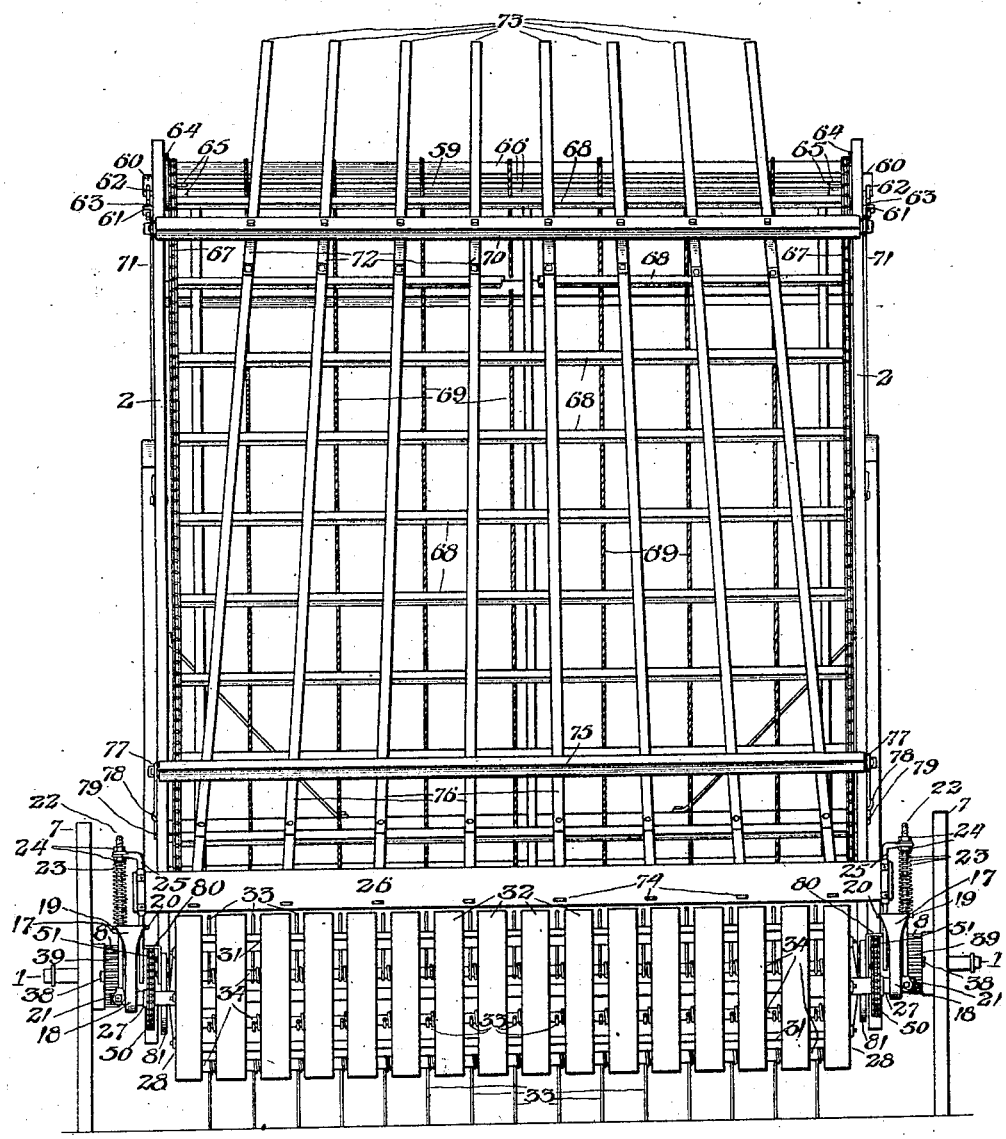

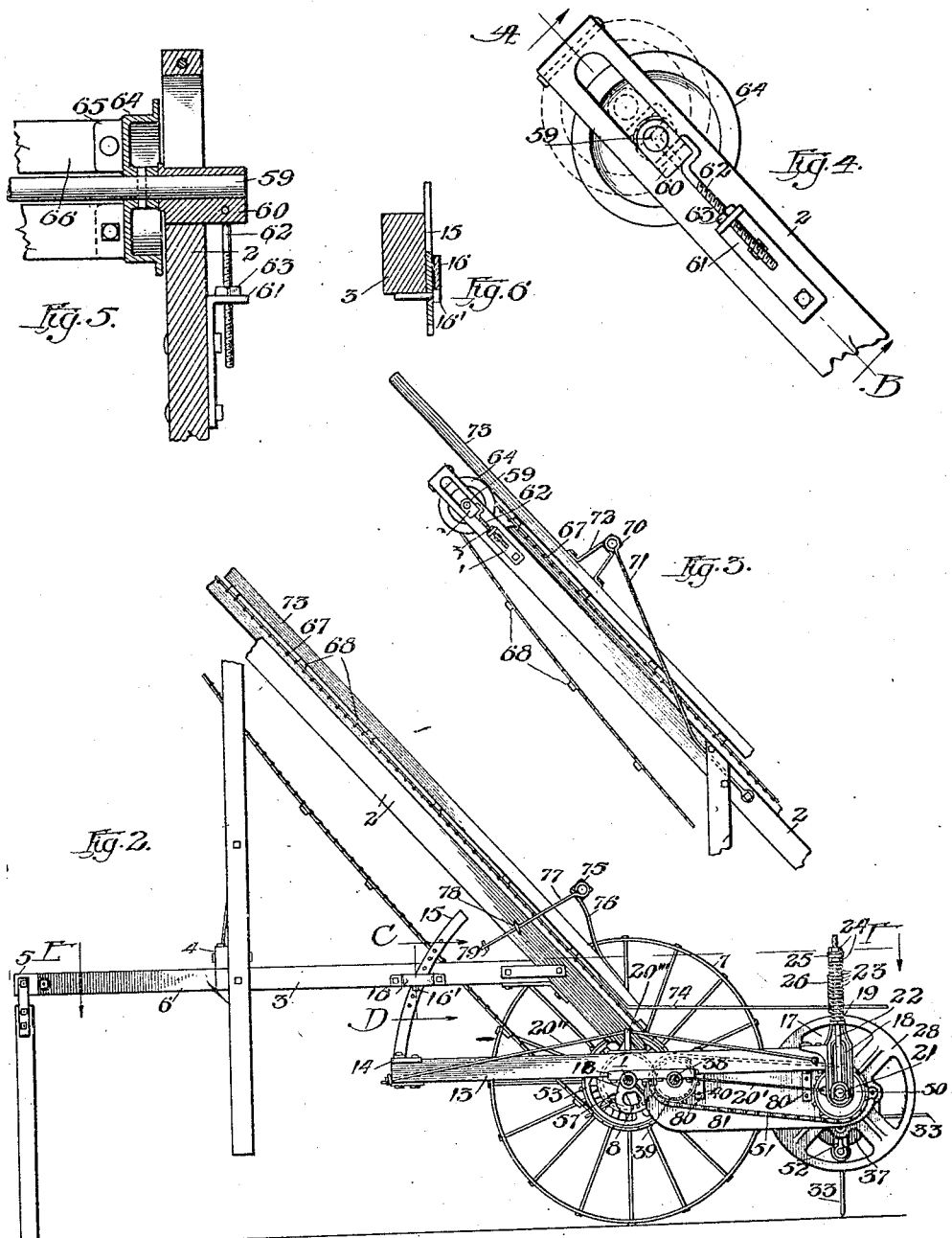

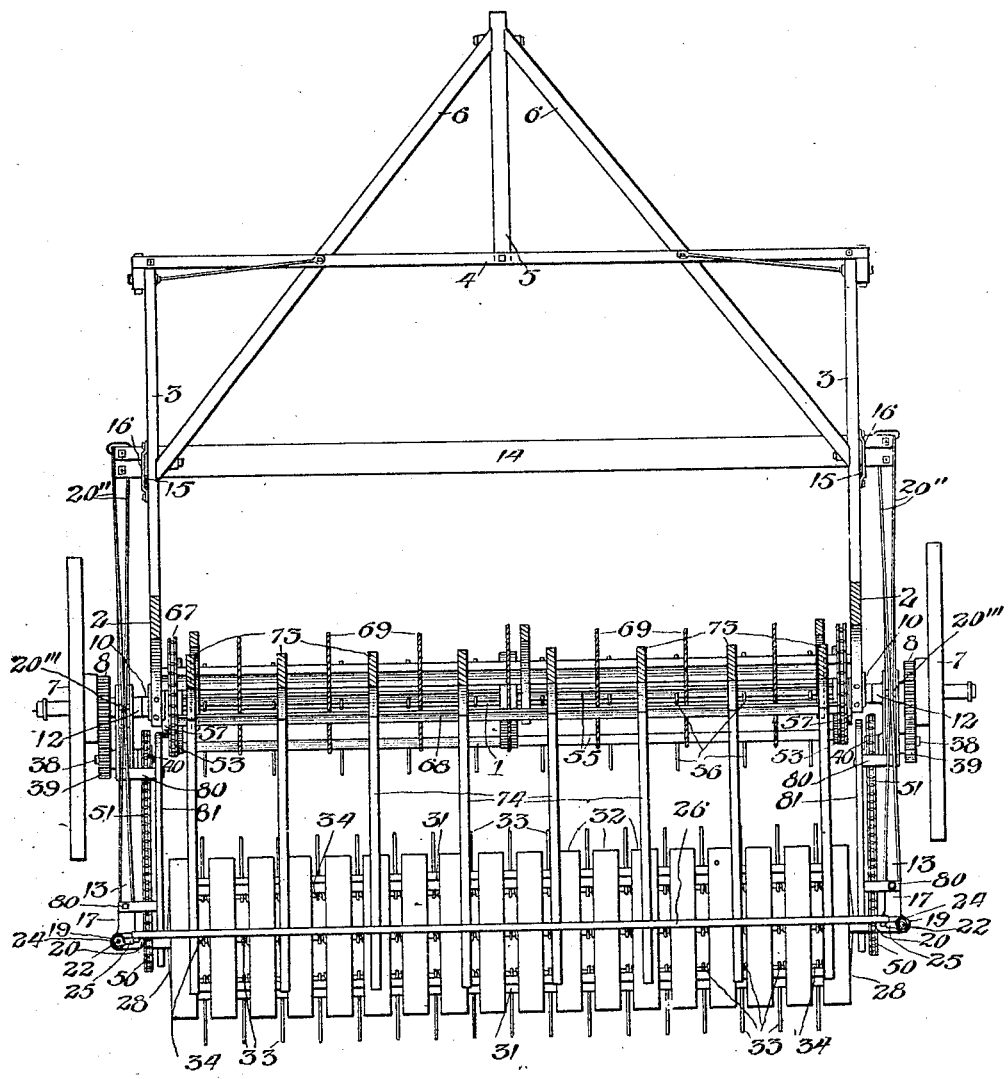

No. 812,213. PATENTED FEB. 13, 1906.
J. W. LATIMER.
HAY LOADER.
APPLICATION FILED OCT. 11, 1905.
6 SHEETS—SHEET 5.
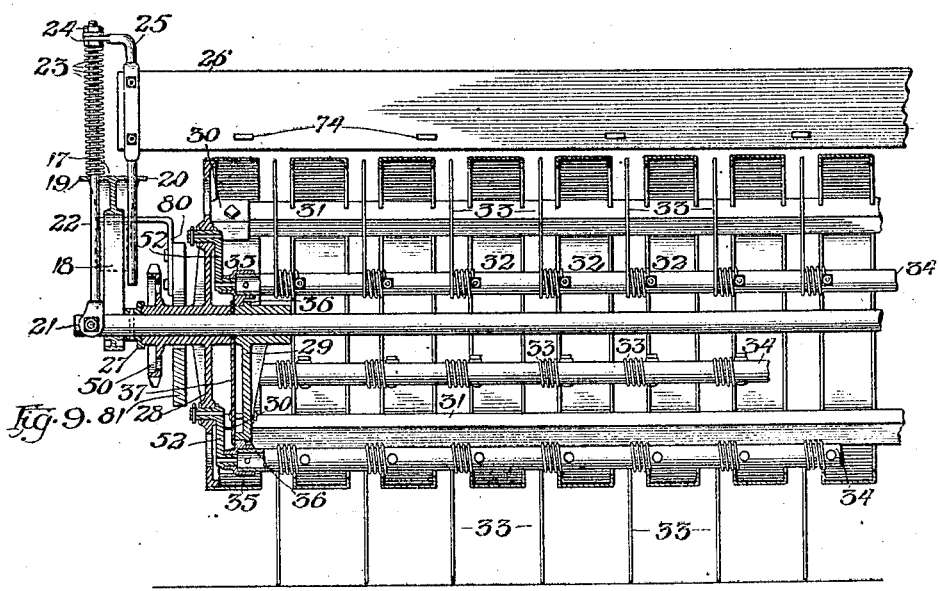
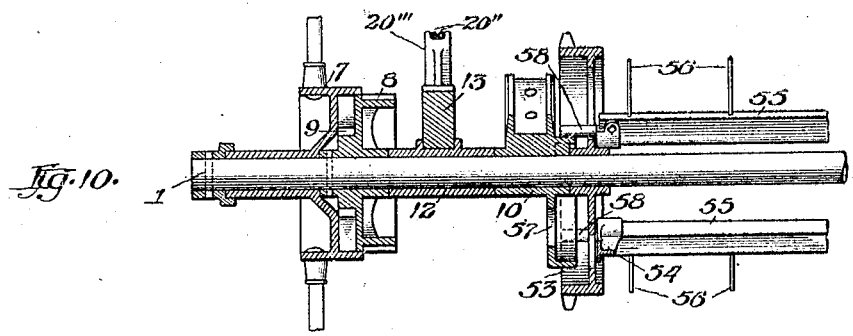
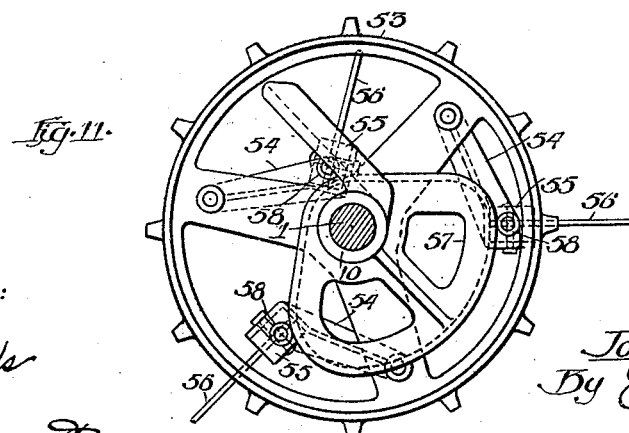
Witnesses:
Inventor
John W. Latimer
By E. W. Burgess
Atty.

No. 812,213.
PATENTED FEB. 13, 1906.
J. W. LATIMER.
HAY LOADER.
APPLICATION FILED OCT. 11, 1905.
6 SHEETS—SHEET 6.
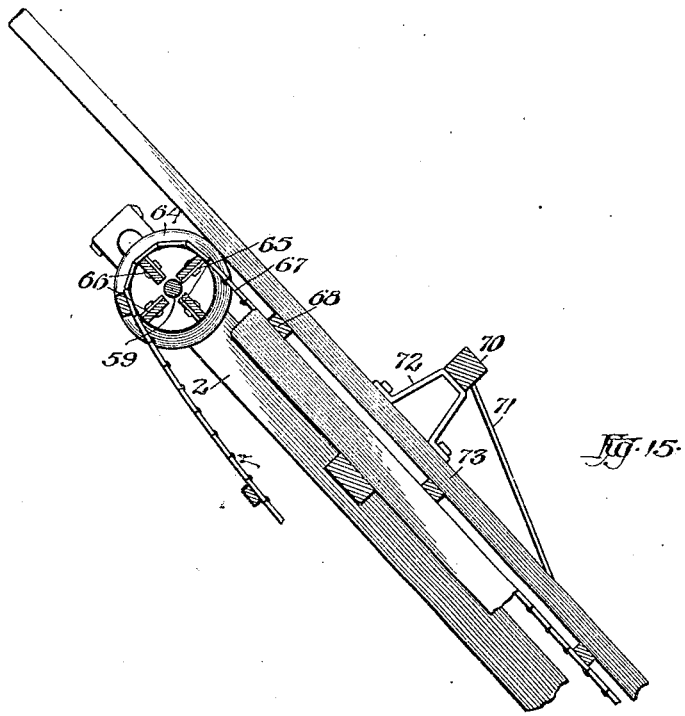
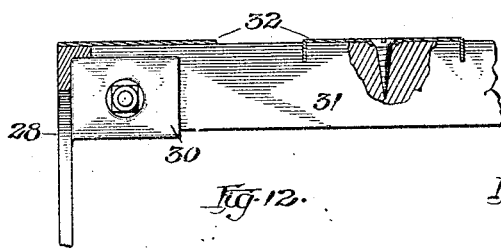
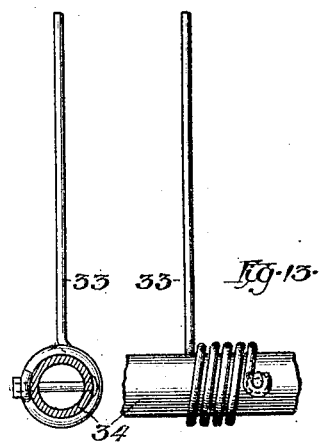
Witnesses:
Inventor:
John W. Latimer
By E. W. Burges
Atty.

UNITED STATES PATENT OFFICE.

JOHN W. LATIMER, OF CHICAGO, ILLINOIS, ASSIGNOR TO INTERNATIONAL HARVESTER COMPANY, A CORPORATION OF NEW JERSEY.

HAY-LOADER.

No. 812,213.

Specification of Letters Patent.

Patented Feb. 13, 1906.

Application filed October 11, 1905. Serial No. 282,288.

*To all whom it may concern:*

Be it known that I, JOHN W. LATIMER, a citizen of the United States, residing at Chicago, in the county of Cook and State of Illinois, have invented certain new and useful Improvements in Hay-Loaders, of which the following is a specification, reference being had to the accompanying drawings, forming a part thereof.

My invention relates to hay rakes and loaders of that type having an elevating and carrier frame mounted upon carrying-wheels and having an endless slatted carrier operative to elevate and deposit the hay upon a wagon in advance of and to which the loader is attached, the hay being raked from the ground and delivered to the endless carrier by means of a raking-cylinder and drum in rear of the carrier and having the cylinder provided with pick-up fingers, the drum and raking-cylinder revolving in a direction opposite to that of the carrying-wheels.

It consists in an improved construction of the frame in which the raking-cylinder and drum are mounted, in the construction of the drum, in the manner of yieldingly mounting it in the frame, in the manner of mounting the compressor-bars, and in such other details of construction designed to lighten and cheapen the construction of machines of the above class, the object being to provide a machine that will be strong and positive in action and comprising few parts. I attain these objects by the mechanism illustrated by the accompanying drawings, in which—

Figure 1 represents a rear view of a hay-loader embodying my invention. Fig. 2 is a side elevation of Fig. 1 with the upper end of the elevating and carrier frame broken away. Fig. 3 is a side elevation of the upper end of the elevator and carrier as broken away from Fig. 2. Fig. 4 is a detail showing the manner in which the endless carrier is mounted at the upper end of the elevator-frame. Fig. 5 is a cross-section on line A B of Fig. 4. Fig. 6 is a cross-section on line C D of Fig. 2. Fig. 7 is a partial plan view of Fig. 2 on line E F. Fig. 8 is an enlarged end elevation, partly in section, of the raking-cylinder and receiving end of the endless carrier. Fig. 9 represents details of the construction and manner of mounting the raking-cylinder. Figs. 10 and 11 represent details of the construction and manner of mounting the stripping-cylinder. Fig. 12 is a detail of the drum. Figs. 13 and 14 are details showing the manner of attaching the rake-teeth to the rake-bars, and Fig. 15 is a sectional detail of the delivery end of the elevator and endless carrier.

Similar numerals refer to similar parts throughout the several views.

A driving-axle 1 is rotatably mounted at the lower end of an elevator-frame having side bars 2, and a draft-frame having forwardly-projecting side bars 3 and cross-bars 4 at the forward ends thereof. A short draft-pole 5 has its rear end secured to the middle of the cross-bar 4, and rearwardly-diverging braces 6 are secured at their forward ends to the opposite end of the draft-pole and have their opposite ends secured to the side members of the draft-frame and their middle portions to the cross-bar 4.

7 represents the carrying and drive wheels loosely mounted at opposite ends of the axle and having any of the well-known spring-operated pawl mechanism connecting them with gear-wheels 8, secured to the axle, and having ratchet-teeth 9 at one side thereof designed to engage with the pawls mounted on the hub of the drive-wheels.

The side bars 2 of the elevator-frame are pivotally mounted upon the axle by means of the bearing-boxes 10, secured thereto. Between the bearing-boxes 10 and the gear-wheels 8 are other bearing-boxes 12, also pivotally mounted upon the axle and to which are secured longitudinally-arranged bars 13, projecting rearward and in front thereof, their front ends being joined by a cross-bar 14, secured thereto and connected with the side bars 3 of the draft-frame by means of the links 15, that are adapted to slide through loops 16, secured to said side bars and having lateral openings adapted to receive a pin 16' to limit the downward movement of the rear end of the frame-bars. Secured to the rear ends of the bars 13 are brackets 17, having depending slotted portions 18 and laterally-projecting wing portions 19 and 20 at their upper ends and upon opposite sides thereof, and braces 20' connect the lower ends of the brackets with the rear ends of the bearing-boxes 12, and truss-rods 20'' have their opposite ends secured to opposite ends of the bars 13 and their middle portion resting upon struts 20'''.

A cross-shaft 21 is loosely embraced at opposite ends by the slotted portion of the brackets 17, and to its extended ends are secured the lower ends of links 22, that extend upward through openings in the projecting wings 19 and through supporting coiled springs 23 and have adjusting-nuts 24 at their upper ends. Between the adjusting-nuts and the upper ends of the springs are slidingly mounted the L-shaped upper ends of links 25, that have their lower ends loosely received by openings in the projecting wings 20, and a cross-bar 26 is secured to their upper ends.

Secured to the cross-shaft 21, adjacent the brackets 17, are short sleeves 27, and rotatably mounted upon the shaft adjacent the sleeves are the drum-heads 28, and at the inner ends of the hub of the drum-heads are secured eccentric disks 29. The drum-heads are provided with inwardly-projecting ears 30 near their peripheries, and bars 31 have their opposite ends secured thereto, and a series of sheet-metal bands 32, having inwardly-turned flanges, are secured thereto, having open spaces between the bands, through which rake-teeth 33 are designed to operate. The rake-teeth are coiled around the rake-heads 34 and secured thereto in a well-known way, and the heads have their opposite ends secured to rake-cylinder heads 35, rotatably mounted upon the eccentrically-mounted disks 29, between the peripheral flanges 36 and the steel plates 37, secured to the faces of the disks.

At the rear end of the bearing-boxes 12 are journaled short shafts 38, having secured at their outer ends pinions 39, meshing with gear-wheels 8, and to their inner ends sprocket-wheels 40, and integral with the hubs of the heads of the drum are sprocket-wheels 50, and sprocket-chains 51 connect the two pairs of sprocket-wheels in a manner to communicate motion from the drive-wheels to the rake-drum. Pivotally connected with the drum-heads are links 52, that have their opposite ends pivotally connected with the rake-teeth heads in a manner to communicate motion thereto. Secured to the axle 1 at the inner ends of the bearing-boxes 10 are sprocket-wheels 53, and pivotally mounted on the spokes thereof are swinging links 54, provided at their free ends with inwardly-projecting ear portions, to which are secured cross-bars 55, having outwardly-projecting teeth 56. The bearing-boxes 10 are provided with inwardly-projecting cams 57, with which rollers 58, mounted upon the outer sides of the free ends of the links 54, are adapted to contact in a manner to govern the position of the links relative to the sprocket-wheels. At the upper end of the elevator-frame is a cross-shaft 59, journaled in sliding bearings 60, mounted in slots at the ends of the side bars 2. Secured to the side bars below the slots are brackets 61, and 62 designates links having hooks at their upper ends engaging with openings in the sliding bearings and their opposite ends adjustably connected with the brackets by means of the threaded ends and nuts 63. Secured to the shaft at the inner ends of the sliding bearings are flanged wheels 64, having inwardly-projecting ears 65, to which are secured cross-bars 66. Sprocket-chains 67 connect the flanged wheels with the sprocket-wheels 53, and cross-slats 68 are secured to the chains and spaced apart in the usual form, and ropes 69 are secured to the slats, the whole being a common form of endless carriers for this class of machines.

Above the endless carrier at its upper end is a transversely-arranged bar 70, having its opposite ends pivotally mounted in the upper ends of flexible bars 71, that have their lower ends secured to the side bars 2, and secured to the transverse bar are a series of depending brackets 72, that have their lower ends secured to floating compressor-bars 73, to the lower ends of which are secured rearwardly-extending bars 74, that have their rear ends loosely received by openings in the cross-bar 26.

A cross-bar 75 extends across the elevator-frame above the lower ends of the compressor-bars, and secured thereto are a series of downwardly and rearwardly depending straps 76, that have their lower ends secured to the compressor-bars. To limit the upward movement of the cross-bar, there is attached thereto at its ends links 77, that are adapted to slide through loops 78, secured to the elevator-frame, and pins 79, passing through the lower ends of the links, contact with the loops when the bar is raised to the limit of its movement.

Secured to the bars 13 in rear of the axle are straps 80, to which are secured shields 81, designed to prevent the hay from winding upon the chain and other associated parts.

In operation the machine is attached to the wagon in the usual manner, and the drive-wheels impart motion to the various parts, the raking-cylinder revolving with the drum. The rake-teeth are alternately projected beyond its periphery and retracted within it by means of the eccentrics secured to the cross-shaft. The raking-cylinder delivers the hay to the endless carrier that is moving in an opposite direction, and the compressor-bars operate to compress the stream of hay and yield upward as the stream increases in thickness.

The raking-cylinder and drum being mounted at the end of the frame that is pivotally mounted upon the axle is free to rise to accommodate itself to the inequalities of the surface of the ground over which it travels, and its downward movement is limited by the stop-pins contacting with the loops, as before described. As a further means for securing a floating effect of the cylinder the coiled springs, in combination with the pendent links, operate to counterpoise a portion of its weight.

What I claim as my invention, and desire to secure by Letters Patent, is:—

1. In a hay-loader, the combination of an axle and carrying-wheels mounted thereon, an elevator and carrier frame mounted upon said axle and extending upward and forward therefrom, a supplemental frame pivotally mounted upon said axle and extending forward and in rear thereof, having its forward end adjustably connected with the elevator-frame, and a raking-cylinder mounted at the rear end thereof.

2. In a hay-loader, the combination of an axle and carrying-wheels mounted thereon, an elevator and carrier frame mounted upon said axle and extending upward and forward therefrom, a supplemental frame pivotally mounted upon said axle and extending forward and in rear thereof, having its forward end adjustably connected with the elevator-frame, and a raking-cylinder yieldingly mounted at the rear end thereof.

3. In a hay-loader, the combination of an axle and carrying-wheels mounted thereon, an elevator and carrier frame mounted upon said axle and extending upward and forward therefrom, a supplemental frame pivotally mounted upon said axle and extending forward and in rear thereof, having its forward end connected with the elevator-frame by means of bars secured to one of the frames and slidably connected with the other, and adjustable stops connected with the bars in a manner to limit the upward movement of the forward end of said supplemental frame, and a raking-cylinder mounted at the rear end thereof.

4. In a hay-loader, the combination of an axle and carrying wheels mounted thereon, an elevator and carrier frame mounted upon said axle and extending upward and forward therefrom, a supplemental frame pivotally mounted upon said axle and extending forward and in rear thereof, having its forward end connected with the elevator-frame by means of bars curved concentrically relative to the axle and having one end secured to said supplemental frame and their opposite ends passing freely through loops secured to said elevator-frame, transverse openings in said bars, and pins received by said openings and contacting with said loops in a manner to limit the upward movement of the forward end of said supplemental frame, and a raking-cylinder yieldingly mounted at the rear end thereof.

5. In a hay-loader, the combination of an axle and carrying-wheels mounted thereon, an elevator and carrier frame mounted upon said axle and extending upward and forward therefrom, a supplemental frame pivotally mounted upon said axle and extending forward and in rear thereof and having its forward end connected with the elevator-frame, brackets secured to the rear end of said frame at opposite sides thereof, said brackets having vertically-arranged slots therein, a shaft extending across said frame and having its ends loosely mounted in said slotted brackets, and a raking-cylinder rotatably mounted upon said shaft.

6. In a hay-loader, the combination of an axle and carrying-wheels mounted thereon, an elevator and carrier frame mounted upon said axle and extending upward and forward therefrom, a supplemental frame pivotally mounted upon said axle and extending forward and in rear thereof and having its forward end connected with the elevator-frame, brackets secured to the rear end of said frame at opposite sides thereof, said brackets having vertically-arranged slots therein, a shaft extending across said frame and having its ends loosely mounted in said slotted brackets, springs operative to suspend the shaft in said brackets, and a raking-cylinder rotatably mounted on the shaft.

7. In a hay-loader, the combination of an axle and carrying-wheels mounted thereon, an elevator and carrier frame mounted upon said axle and extending upward and forward therefrom, a supplemental frame pivotally mounted upon said axle and extending forward and in rear thereof and having its forward end connected with the elevator-frame, brackets secured to the rear end of said frame and at opposite sides thereof, said brackets having vertically-arranged slots therein, a shaft extending across said frame and having its ends loosely mounted in said slotted brackets, links having their lower ends secured to said shaft and their upper ends passing loosely through openings in the upper ends of said brackets, and coiled springs surrounding the links above said brackets and operative to yieldingly support said shaft, and a raking-cylinder rotatably mounted upon said shaft.

8. In a hay-loader, the combination of an axle and carrying-wheels mounted thereon, an elevator and carrier frame mounted upon said axle and extending upward and forward therefrom, a supplemental frame pivotally mounted on said axle and extending forward and in rear thereof and having its forward end connected with the elevator-frame, brackets secured to the rear end of said frame and at opposite sides thereof, said brackets having vertically-arranged slots therein, a shaft extending across said frame and having its ends loosely mounted in said slotted brackets, links having their lower ends secured to said shaft and their upper ends passing loosely through openings in the upper ends of said brackets, coiled springs surrounding the links above said brackets, supplemental links having their upper ends secured to the upper ends of the first-mentioned links and their lower ends passing loosely through openings in the brackets, a cross-bar having its opposite ends secured to said supplemental links, and a raking-cylinder rotatably mounted upon said shaft.

9. In a hay-loader, the combination of an axle and carrying-wheels mounted thereon, an elevator and carrier frame mounted upon said axle and extending upward and forward therefrom, a supplemental frame pivotally mounted on said axle and extending forward and in rear thereof and having its forward end connected with the elevator-frame, a raking-cylinder mounted at the rear end of said supplemental frame, a cross-bar arranged above said cylinder and supported at opposite ends upon the frame, compressor-bars extending longitudinally above said elevator and carrier frame and having their lower ends slidably connected with said cross-bar.

10. A raking mechanism for hay-loaders comprising, in combination, a fixed shaft, oppositely-disposed heads rotatably mounted upon said shaft, said heads being connected by means of bars secured to the peripheries thereof, a series of bands secured to said bars in a manner to have intervening spaces between the bands, a raking-cylinder mounted within said bands, and heads having rake-teeth and means for projecting and retracting said teeth through said spaces.

11. A raking mechanism for hay-loaders comprising, in combination, a fixed shaft, oppositely-disposed heads rotatably mounted upon said shaft, said heads being connected by means of bars secured to the peripheries thereof, a series of bands secured to said bars in a manner to have intervening spaces between the bands, said bands having inwardly-turned edges, a raking-cylinder mounted within said bands, and heads having rake-teeth and means for projecting and retracting said teeth through said spaces.

12. In a hay-loader, the combination of an axle and carrying-wheels mounted thereon, an elevator and carrier frame mounted upon said axle and extending upward and forward therefrom, a supplemental frame extending forward and in rear of said axle, comprising side bars and having its forward end adjustably connected with the elevator-frame, a raking-cylinder carried by the rear end of said supplemental frame, journal-boxes secured to said side bars and having said axle journaled therein, short shafts journaled in said boxes in rear of said axle and having pinions secured to their outer ends and sprocket-wheels to their inner ends upon opposite sides of said side bars, pinions secured to the axle and meshing with said first-named pinions, sprocket-wheels connected with said raking-cylinder, and sprocket-chains connecting the two sets of sprocket-wheels.

13. In a hay-loader, the combination of an axle and carrying-wheels mounted thereon, an elevator and carrier frame mounted upon said axle and extending upward and forward therefrom, a supplemental frame extending forward and in rear of said axle, comprising side bars and having its forward end connected with the elevator-frame, a raking-cylinder carried by the rear end of said supplemental frame, journal-boxes secured to said side bars and having said axle journaled therein, short shafts journaled in said boxes in rear of said axle and having pinions secured at their outer ends and sprocket-wheels to their inner ends upon opposite sides of said side bars, pinions secured to the axle and meshing with said first-named pinions, sprocket-wheels connected with said raking-cylinder, sprocket-chains connecting the two sets of sprocket-wheels, and shields depending from said side bars inside said sprocket-chains.

In witness whereof I hereto affix my signature in presence of two witnesses.

JOHN W. LATIMER.

Witnesses:
WELLS WININGSTAD,
C. F. CRUMB.